United States Patent
Zhang et al.

(10) Patent No.: US 10,769,465 B2
(45) Date of Patent: Sep. 8, 2020

(54) METHOD FOR BIOMETRIC RECOGNITION AND TERMINAL DEVICE

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 115 days.

(21) Appl. No.: 16/033,872

(22) Filed: Jul. 12, 2018

(65) Prior Publication Data

US 2019/0026576 A1 Jan. 24, 2019

(30) Foreign Application Priority Data

Jul. 18, 2017 (CN) .......................... 2017 1 0585884

(51) Int. Cl.
*G06K 9/00* (2006.01)

(52) U.S. Cl.
CPC ....... *G06K 9/00919* (2013.01); *G06K 9/0061* (2013.01); *G06K 9/00221* (2013.01); *G06K 9/00255* (2013.01); *G06K 9/00288* (2013.01); *G06K 9/00604* (2013.01); *G06K 9/00617* (2013.01); *G06K 9/00892* (2013.01)

(58) Field of Classification Search
CPC combination set(s) only.
See application file for complete search history.

(56) References Cited

U.S. PATENT DOCUMENTS

| 9,147,117 | B1* | 9/2015 | Madhu | G06K 9/00335 |
| 2006/0165266 | A1* | 7/2006 | Hamza | G06K 9/00597 |
| | | | | 382/117 |
| 2013/0129164 | A1 | 5/2013 | Gu et al. | |
| 2014/0333414 | A1* | 11/2014 | Kursun | G06K 9/00926 |
| | | | | 340/5.82 |
| 2015/0294464 | A1* | 10/2015 | Kim | G06K 9/00597 |
| | | | | 382/117 |

(Continued)

FOREIGN PATENT DOCUMENTS

| CN | 103136505 A | 6/2013 |
| CN | 103761463 A | 4/2014 |

(Continued)

OTHER PUBLICATIONS

Extended European search report issued in corresponding European application No. 18181636.4 dated Nov. 26, 2018.

(Continued)

*Primary Examiner* — Leon Viet Q Nguyen

(57) ABSTRACT

A method and related terminal device for biometric recognition are provided. The method includes: detecting a target distance between a terminal device and a human face through a distance sensor; capturing an iris image through an iris camera and performing iris recognition based on the iris image, when the target distance falls within an iris recognition distance range; capturing a human face image through a front camera and performing face recognition based on the human face image, when the target distance falls within a human face recognition distance range.

17 Claims, 9 Drawing Sheets

(56) References Cited

U.S. PATENT DOCUMENTS

2016/0180169 A1* 6/2016 Bae .................... H04N 5/33
                                                    382/117
2016/0267319 A1    9/2016 Murillo et al.
2017/0061210 A1*  3/2017 Ollila ................. H04N 1/00307
2018/0165437 A1*  6/2018 Shim ................. G06K 9/00342

FOREIGN PATENT DOCUMENTS

CN    105320943 A    2/2016
EP      1241634 A2   9/2002

OTHER PUBLICATIONS

International search report issued in corresponding international application No. PCT/CN2018/095944 dated Oct. 23, 2018.

* cited by examiner

METHOD FOR BIOMETRIC RECOGNITION AND TERMINAL DEVICE

CROSS-REFERENCE TO RELATED APPLICATION(S)

This application claims priority to Chinese Application Patent Serial No. 201710585884.5, filed on Jul. 18, 2017, the content of which is hereby incorporated by reference in its entirety.

TECHNICAL FIELD

The present disclosure relates to the technical field of terminal devices, and more particularly to a method for biometric recognition and a terminal device.

BACKGROUND

With the popularization of mobile terminals, such as mobile phones, tablet computers, and so on, in modern life, almost everyone holds a mobile phone. In order to ensure the security of the mobile phones, fingerprint recognition is generally adopted in existent mobile phones to unlock the screen to improve security. However, during the fingerprint recognition process, there is an operation process that the user needs to press the fingerprint recognition area of the mobile terminal with the fingerprint surface of his/her finger, but the operation process is difficult to achieve in many special situations (such as finger greasy, finger moist, finger peeling, and so on), resulting in a slow unlocking speed.

SUMMARY

Implementations of the present disclosure provide a method for biometric recognition and a terminal device, which can quickly select suitable biometric recognition manners for biometric recognition, and increase the speed of the biometric recognition.

According to a first aspect of the implementations of the present disclosure, a terminal device is provided. The terminal device includes an application processor AP, and a distance sensor, an iris camera, and a front camera coupled to the AP. The distance sensor is configured to detect a target distance between the terminal device and a human face, when fingerprint recognition is performed and when the number of fingerprint matching failure times detected reaches a predetermined number of times. The iris camera is configured to capture an iris image when the target distance falls within an iris recognition distance range. The front camera is configured to capture a human face image when the target distance falls within a human face recognition distance range. The AP is configured to perform at least one of iris recognition based on the iris image, and face recognition based on the human face image.

According to a second aspect of the implementations of the present disclosure, a method for biometric recognition is provided. The method includes the following: detecting a target distance between a terminal device and a human face through a distance sensor; capturing an iris image through an iris camera and performing iris recognition based on the iris image, when the target distance falls within an iris recognition distance range; and capturing a human face image through a front camera and performing face recognition based on the human face image, when the target distance falls within a human face recognition distance range.

According to a third aspect of the implementations of the disclosure, a non-transitory computer readable storage medium is provided. The non-transitory computer readable storage medium stores a computer program which, when executed by a processor, causes the processor to carry out following actions: detecting a target distance between a terminal device and a human face through a distance sensor; capturing an iris image through an iris camera and performing iris recognition based on the iris image, when the target distance falls within an iris recognition distance range; and capturing a human face image through a front camera and performing face recognition based on the human face image, when the target distance falls within a human face recognition distance range.

BRIEF DESCRIPTION OF THE DRAWINGS

To describe technical solutions in the implementations of the present disclosure or of the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
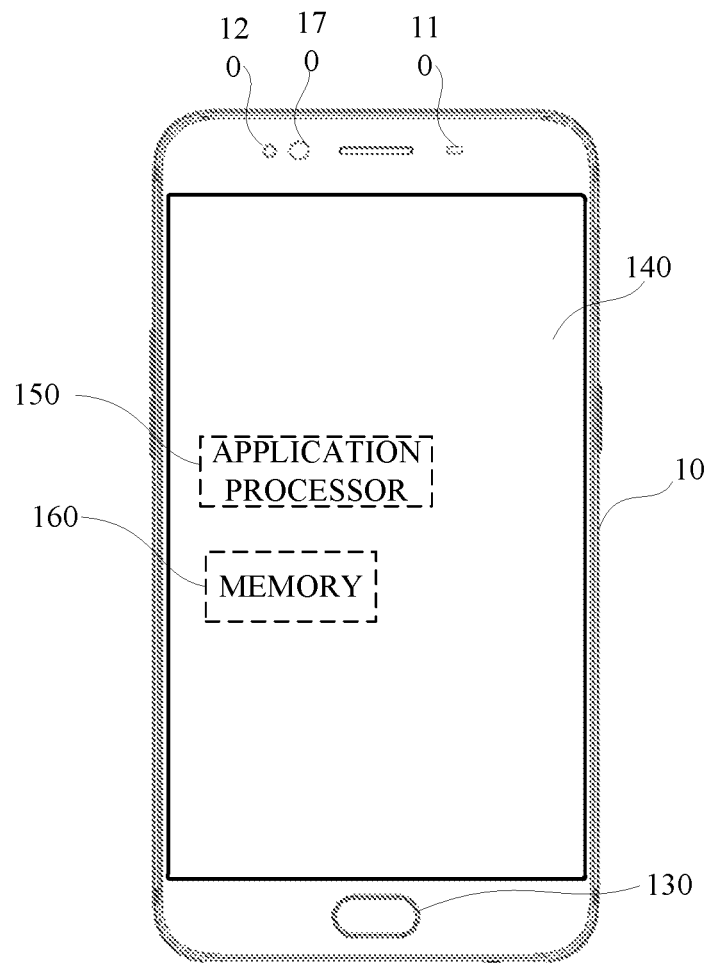
FIG. 1 is a schematic diagram of an operating principle of biometric recognition according to an implementation of the present disclosure.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The present disclosure relates to a terminal device. The terminal device includes an application processor AP, and a distance sensor, an iris camera, and a front camera coupled to the AP. The distance sensor is configured to detect a target distance between the terminal device and a human face, when fingerprint recognition is performed and when the number of fingerprint matching failure times detected reaches a predetermined number of times. The iris camera is configured to capture an iris image when the target distance falls within an iris recognition distance range. The front camera is configured to capture a human face image when the target distance falls within a human face recognition distance range. The AP is configured to perform at least one of iris recognition based on the iris image and face recognition based on the human face image.

The present disclosure further relates to a method for biometric recognition. The method includes the following: detecting a target distance between a terminal device and a human face through a distance sensor; when the target distance falls within an iris recognition distance range, capturing an iris image through an iris camera and performing iris recognition based on the iris image; and when the target distance falls within a human face recognition distance range, capturing a human face image through a front camera and performing face recognition based on the human face image.

The present disclosure further relates to a terminal device. The terminal device includes an application processor AP, and a distance sensor, an iris camera, and a memory respectively coupled to the AP. The memory is configured to store one or more programs. The one or more programs are configured to be executed by the AP. The programs include instructions operable with a computer to execute part or all of the operations described in above-described method.

The present disclosure further relates to a terminal device. The terminal device includes a detecting unit and an acquiring and determining unit. The detecting unit is configured to detect a target distance between the terminal device and a human face through a distance sensor. The acquiring and determining unit is configured to capture an iris image through an iris camera and perform iris recognition based on the iris image, when the target distance falls within an iris recognition distance range. The acquiring and determining unit is further configured to capture a human face image through a front camera and perform face recognition based on the human face image, when the target distance falls within a human face recognition distance range.

The terminal device involved in the implementations of the present disclosure may include various handheld devices, in-vehicle devices, wearable devices, computing devices that have wireless communication functions or other processing devices coupled to the wireless modem, as well as various forms of user equipment (UE), mobile stations (MS), terminal devices, and so on. For the convenience of description, the above-mentioned devices are collectively referred to as a terminal device.

Hereinafter, the implementations of the present disclosure will be introduced in details.

To understand the implementations of the disclosure more clearly, an operating principle of fingerprint recognition and iris recognition of the implementations of the present disclosure will be introduced first. FIG. 1 is a schematic diagram of an operating principle of biometric recognition according to an implementation of the present disclosure. The biometric recognition of FIG. 1 is applied to a terminal device. The following describes a mobile phone as an example of the terminal device. As illustrated in FIG. 1, the distance sensor 110, an iris camera 120, a fingerprint recognition module 130, and a display screen 140 are all arranged on the front of a mobile phone 10. The fingerprint recognition module 130 is configured to acquire a fingerprint image. The iris camera 120 is configured to capture an iris image. The iris image may be a black-and-white iris image. When the iris camera 120 works, a front infrared flashlight may be used to fill light. The distance sensor 110 is configured to detect the distance between the mobile phone 10 and a human face. In at least one alternative implementation, an AP 150, a memory 160, and a front camera 170 may also be included in FIG. 1. The AP 150 and the memory 160 cannot be directly viewed from an outside of the mobile phone 10, which are therefore represented by dashed lines in FIG. 1.

In the implementation of the present disclosure, the AP 150 may compare the fingerprint image acquired by the fingerprint recognition module 130 with a fingerprint recognition template stored in the memory 160. When the number of fingerprint matching failure times detected reaches a predetermined number of times (the predetermined number of times may be a positive integer), the AP 150 detects the distance between the mobile phone 10 and a human face through the distance sensor 110. When the distance sensor 110 detects that the distance between the mobile phone 10 and the human face falls within an iris recognition distance range (for example, the iris recognition distance range may be set to 20-40 cm), the iris camera 120 may capture the iris image, and the AP 150 may perform iris recognition. If the iris recognition is successful, other operations such as unlocking and payment can be allowed to be performed. The biometric recognition in the implementation of the present disclosure can be applied to scenes such as screen unlocking, mobile payment, and so on, which requires secure authentication.

Figure 2:
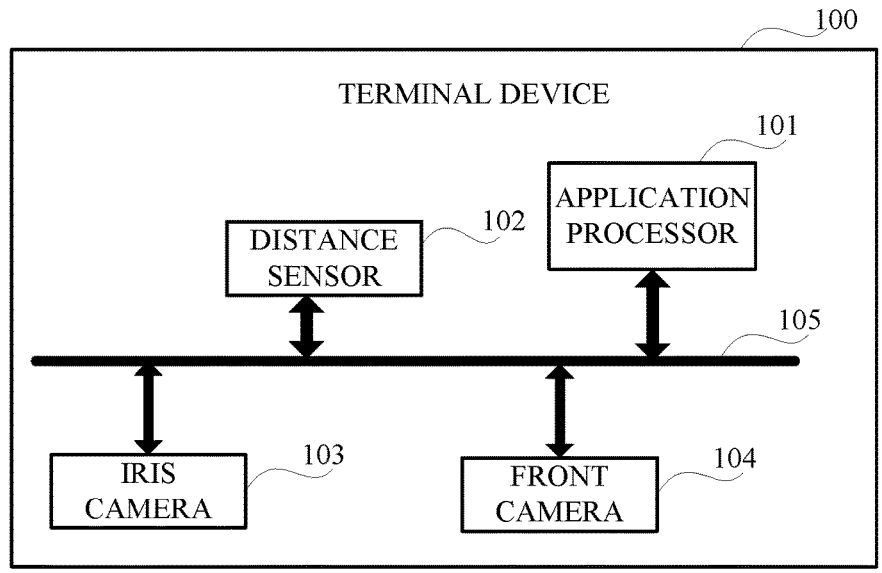
FIG. 2 is a schematic structural diagram of a terminal device according to an implementation of the present disclosure.

FIG. 2 is a schematic structural diagram of a terminal device according to an implementation of the present disclosure. As illustrated in FIG. 2, the terminal device 100 includes an application processor (AP) 101, a distance sensor 102, an iris camera 103, and a front camera 104. The AP 101 is coupled to the distance sensor 102, the iris camera 103 and the front camera 104 via a bus 105.

The distance sensor 102 is configured to detect a target distance between the terminal device and a human face.

In the implementation of the present disclosure, the distance sensor 102 may be an infrared distance sensor which is configured to calculate the distance between the terminal device and the human face, according to the time difference between infrared rays transmitted and infrared rays received. The target distance is the distance between the terminal device and the human face.

The iris recognition distance range may be pre-set and stored in the memory of the terminal device 100. The memory may be a non-volatile storage. For example, the iris recognition distance range is from 20 cm to 40 cm.

The iris camera 103 is configured to capture an iris image when the target distance falls within the iris recognition distance range.

The front camera 104 is configured to capture a human face image when the target distance falls within a human face recognition distance range. The AP 101 is configured to perform at least one of iris recognition based on the iris image and perform face recognition based on the human face image.

The iris recognition distance range and the human face recognition distance range may be provided with an overlapping range, or no overlapping range. If there is no overlapping range between the iris recognition distance range and the human face recognition distance range, for example, the iris recognition distance range is from 15 to 40 cm, and the human face recognition distance range is from 41 cm to 70 cm, at this time, the AP 101 is configured to perform the iris recognition based on the iris image, or perform the face recognition based on the human face image. That is, the AP 101 performs only one type of biometric recognition.

If there is an overlapping range between the iris recognition distance range and the human face recognition distance range, for example, the iris recognition distance range is from 15 cm to 40 cm, and the human face recognition distance range is from 20 cm to 70 cm, at this time, the AP 101 is configured to perform at least one of the iris recognition based on the iris image and the face recognition based on the human face image. That is, the AP 101 may perform one type of biometric recognition, or the AP 101 may perform two types of biometric recognition. For example, if the target distance falls within the iris recognition distance range as well as the human face recognition distance range (for example, the target distance detected by the distance sensor 102 is 28 cm), the iris camera 103 and the front camera 104 work at the same time, that is, the iris camera 103 captures the iris image, the front camera 104 captures the human face image, and the AP 101 performs the iris recognition and the face recognition at the same time. When at least one of the iris recognition and the face recognition is successful, the biometric recognition is considered to be successful.

The AP 101 may perform the iris recognition based on the iris image as follow.

The AP 101 determines whether the iris image is a legal iris image, and determines that the iris recognition is successful when the iris image is a legal iris image.

In the implementation of the present disclosure, the iris image captured by the iris camera 103 may be a black-and-white iris image. The black-and-white iris image may be captured by the iris camera 103 with the aid of an infrared flashlight.

The AP 101 may determine whether the iris image is a legal iris image as follow.

The AP 101 extracts iris feature points of the iris image and encodes the iris feature points to obtain an iris feature code(s).

The AP 101 compares the iris feature code with a pre-stored iris feature code(s) to determine whether the iris feature code matches pre-stored iris feature code.

If the iris feature code matches the pre-stored iris feature code, the AP 101 determines that the iris image is a legal iris image; if the iris feature code does not match the pre-stored iris feature code, the AP 101 determines that the iris image is not a legal iris image.

When the iris image is a legal iris image, the AP 101 determines that the iris recognition is successful.

In at least one alternative implementation, when the iris image is not a legal iris image, the AP 101 determines that the iris recognition is failed.

According to the terminal device illustrated in FIG. 2, the terminal device detects the target distance between the terminal device and a human face through the distance sensor. When the target distance falls within the iris recognition distance range, the terminal device enables the iris recognition function, and when the target distance falls within the human face recognition distance range, the terminal device enables the face recognition function. The terminal device can perform the iris recognition when the iris recognition condition is satisfied, and perform the face recognition when the face recognition condition is satisfied, which can quickly select a suitable method for biometric recognition to recognize a living body, thereby increasing the speed of the biometric recognition, and can realize rapid biometric recognition without user's perception, which can improve the user experience.

Figure 3:
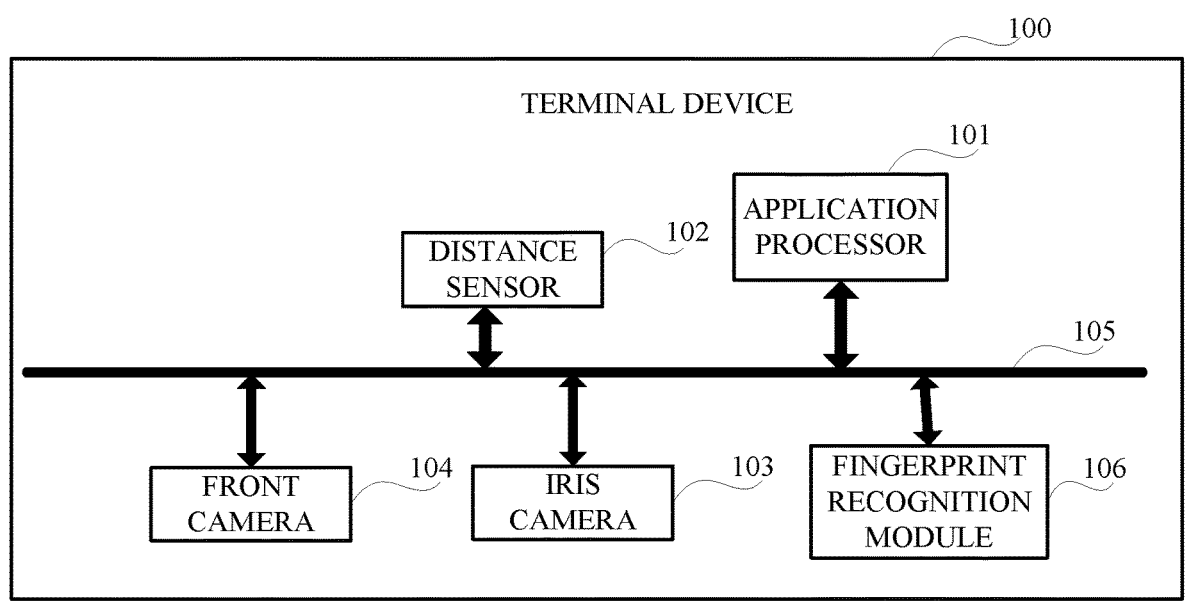
FIG. 3 is a schematic structural diagram of another terminal device according to an implementation of the present disclosure.

In at least one alternative implementation, as illustrated in FIG. 3, the terminal device 100 may further include a fingerprint recognition module 106. The fingerprint recognition module 106 is configured to acquire a fingerprint image.

The distance sensor 102 is configured to detect a target distance between the terminal device and a human face, when fingerprint recognition is performed by the fingerprint recognition module 106 and when the number of fingerprint matching failure times detected reaches a predetermined number of times.

When the number of fingerprint matching failure times by the user on the terminal device reaches the predetermined times, it indicates that the fingerprint recognition effect is bad. At this time, the terminal device detects the target distance between the terminal device and the human face through the distance sensor. When the target distance falls within the iris recognition distance range, the terminal device enables the iris recognition function, and when the target distance falls within the human face recognition distance range, the terminal device enables the face recognition function. When the fingerprint recognition effect is bad (such as finger greasy, finger moist, finger peeling, and so on), the implementation of the present disclosure may perform the iris recognition function when the iris recognition condition is satisfied, and perform the face recognition when the face recognition condition is satisfied, which can quickly switch the methods for biometric recognition, thereby increasing the speed of the biometric recognition.

In at least one alternative implementation, the front camera 104 is further configured to detect an included angle between the terminal device and the human face, when the target distance falls within the iris recognition distance range.

The AP 101 is further configured to capture an iris image through the iris camera 103 and determine whether the iris image is a legal iris image, when the included angle between the terminal device and the human face falls within an iris recognition included angle range.

In the implementation of the present disclosure, the front camera 104 detects the included angle between the terminal device and the human face as follow. The front camera 104 captures a human face image, and the AP 101 extracts the facial features from the human face image, and determines an included angle corresponding to the facial features extracted, according to the facial features extracted and a corresponding relationship between facial features and included angles, where the corresponding relationship is pre-stored in the memory of the terminal device, and then the AP 101 can determine the included angle between the terminal device and the human face according to the human face image. The facial features may include a first distance between the forehead and the chin, a second distance between the left-face edge and the right-face edge, and a ratio of the first distance to the second distance. The corresponding relationship between the facial features and the included angles can be pre-set. The front camera 104 may capture the human face images at different angles, and calculates the facial features in the human facial images, thereby establishing the corresponding relationship between the facial features and the included angles. In the implementation of the present disclosure, the iris recognition is performed under both of the distance condition and the included angle condition are satisfied, and the iris recognition may be performed within the distance range and the included angle range required for the iris recognition, so as to improve the accuracy of the iris recognition. For example, the iris recognition included angle range is from 0 degree to 15 degree.

In at least one alternative implementation, the front camera 104 is further configured to detect an included angle between the terminal device and the human face, when the target distance falls within the human face recognition distance range.

The AP 101 is further configured to capture a human face image through the front camera 104 and determine whether the human face image is a legal human face image, when the included angle between the terminal device and the human face falls within a face recognition included angle range.

For example, the face recognition included angle range is from 0 degree to 50 degrees. In the implementation of the present disclosure, the face recognition is performed under both of the distance condition and the included angle condition are satisfied, and the face recognition may be performed within the distance range and the included angle range required for the face recognition, so as to improve the accuracy of the face recognition.

In at least one alternative implementation, the AP 101 is further configured to output a hint message for prompting the user to adjust the distance between the terminal device and the human face, when the target distance neither falls within the iris recognition distance range nor falls within the human face recognition distance range.

The implementation of the present disclosure may output a hint message to hint a user to adjust the distance between the terminal device and the human face, when the target distance neither falls within the iris recognition distance range nor falls within the human face recognition distance range, thereby prompting the user to move the terminal device to a suitable position to keep a suitable distance from the terminal device to the human face, when the user holds the terminal device too far or too close to the human face, so as to facilitate the iris recognition or face recognition performed in the terminal device, and speed up the biometric recognition.

In the implementation of the present disclosure, when the target distance does not fall within the iris recognition distance range, the AP 101 further determines whether the target distance falls within the human face recognition distance range. If the target distance falls within the human face recognition distance range, the front camera 104 captures the human face image, and the AP 101 determines whether the human face image is a legal human face image. The human face recognition distance range may be set to 10 cm to 70 cm.

The AP 101 is further configured to perform iris recognition based on the iris image captured by the iris camera 103, when the target distance falls within the iris recognition distance range as well as the human face recognition distance range.

Since the security of the iris recognition is higher, the iris recognition is prioritized to be performed when the number of fingerprint matching failure times reaches a predetermined number of times, and the face recognition is performed only when the condition required for performing the iris recognition is not satisfied. Priority is given to more secure biometric recognition manner, thereby improving the security of the biometric recognition.

The AP 101 may determine whether the human face image is a legal human face image as follow.

The AP 101 compares the human face image with a pre-stored human face image template to determine whether the human face image matches the pre-stored human face image template.

If the human face image matches the pre-stored human face image template, the AP 101 determines that the human face image is a legal human face image; If the human face image does not match any pre-stored human face image template, the AP 101 determines that the human face image is not a legal human face image.

When the human face image is a legal human face image, the AP 101 determines that the face recognition is successful.

In at least one alternative implementation, when the human face image is not a legal human face image, the AP 101 determines that the face recognition is failed.

In the implementation of the present disclosure, the human face image template may include facial features such as eyes features (such as the size and shape of the eyeballs, eyes interval, and so on), nose features (nostrils interval, nose tip length, and so on), mouth features (lip thickness, lip length, and so on), and combination features (distance from the nostrils to a position between the left and right eyes, distance from the left eye to the lips, and so on).

In at least one alternative implementation, before the AP 101 determines whether the human face image matches the pre-stored human face image template, the human face image may be converted into a standard image. The standardization mentioned herein includes pixel standardization, image size standardization, and so on.

In the implementation of the present disclosure, when the fingerprint matching failures times by the user on the terminal device reaches a predetermined times, it indicates that the fingerprint recognition effect is bad. At this time, the terminal device detects the target distance between the terminal device and the human face through the distance sensor. When the target distance falls within the iris recognition distance range, the terminal device enables the iris recognition function. When the target distance does not fall within the iris recognition distance range, the AP 101 further determines whether the target distance falls within the human face recognition distance range. When the target distance falls within the human face recognition distance range, the terminal device enables the face recognition function. When the fingerprint recognition effect is bad, the implementation of the present disclosure may perform the iris recognition function when the iris recognition condition is satisfied, and perform the face recognition when the iris recognition condition is not satisfied while the face recognition condition is satisfied, which can quickly switch the methods for biometric recognition, thereby increasing the speed of the biometric recognition. Since the security of the iris recognition is higher, the iris recognition is prioritized to be performed when the number of fingerprint matching failure times reaches a predetermined number of times, and the face recognition is performed only when the condition required for performing the iris recognition is not satisfied. Priority is given to more secure biometric recognition manner, thereby improving the security of the biometric recognition.

Figure 4:
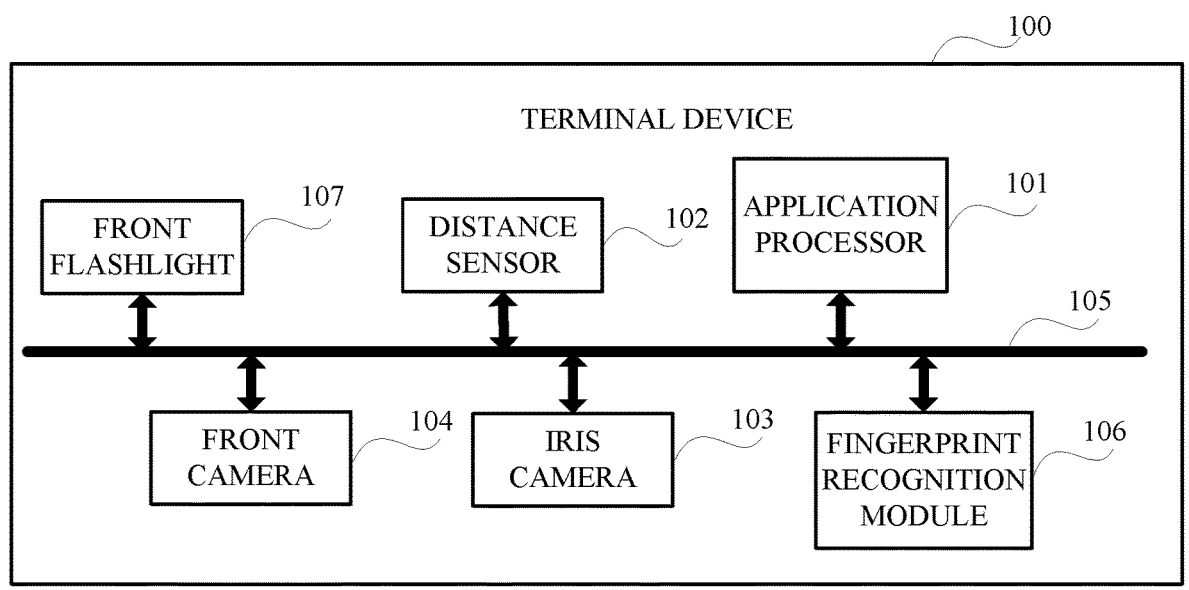
FIG. 4 is a schematic structural diagram of another terminal device according to an implementation of the present disclosure.

In at least one alternative implementation, as illustrated in FIG. 4, the terminal device 100 further includes a front flashlight 107 coupled to the AP 101. The front camera 104 is further configured to capture a first human eye image when the front flashlight 107 is turned off during the iris camera 103 capturing the iris image.

The front camera 104 is further configured to capture a second human eye image when the front flashlight 107 is turned on.

The AP 101 is further configured to determine whether an absolute value of a difference between an eyeball area ratio in the first human eye image and an eyeball area ration in the second human eye image is greater than a threshold value.

The AP 101 is further configured to determine whether the iris image is a legal iris image, when the absolute value of the difference between the eyeball area ratio in the first human eye image and the eyeball area ration in the second human eye image is greater than the threshold value.

In at least one alternative implementation, the AP 101 is further configured to determine that the iris image captured is a non-living iris image, when the absolute value of the difference between the eyeball area ratio in the first human eye image and the eyeball area ration in the second human eye image is smaller than or equal to the threshold value.

The eyeball area ratio refers to a ratio of an area of an eyeball area in the human eye image to an area of the entire human eye image. The AP 101 determines whether the absolute value of the difference between the eyeball area ratio in the first human eye image and the eyeball area ration in the second human eye image is greater than the threshold value, in order to further determine whether the human eye image captured is a living human eye image, that is, whether the object photographed by the front camera 104 is a living body. If the object being photographed is a living body, as the pupils of the human eyes will constrict under strong light, the first human eye image is captured by the front camera 104 when the front flashlight 107 is turned off, and the second human eye image is captured by the front camera 104 when the front flashlight 107 is turned on, therefore, the pupils of the human eyes in the second human eye image is constricted, and the eyeball area ration in the second human eye image is smaller than that of the first human eye image. Therefore, there is a great change between the eyeball area ration in the first human eye image and the eyeball area ratio in the second human eye image, and the absolute value of the difference between the eyeball area ratio in the first human eye image and the eyeball area ration in the second human eye image is thus greater than the threshold value. On the other hand, if the object being photographed is a non-living body, for example, an eyeball of a dead body, a photo, and so on, there generally is no great change between the eyeball area ration in the first human eye image and the eyeball area ratio in the second human eye image, and the absolute value of the difference between the eyeball area ratio in the first human eye image and the eyeball area ration in the second human eye image is thus smaller than the threshold value. With aid of the implementation of the disclosure, it is possible to determine whether the human eye image captured is a living human eye image by determining whether the absolute value of the difference between the eyeball area rations in the human eye images captured by the front camera 104 is greater than the threshold value, where the human eye images are captured when the front flashlight 107 in two states of being turned off and on. Therefore, a simple the living body recognition scheme can be achieved.

Figure 5:
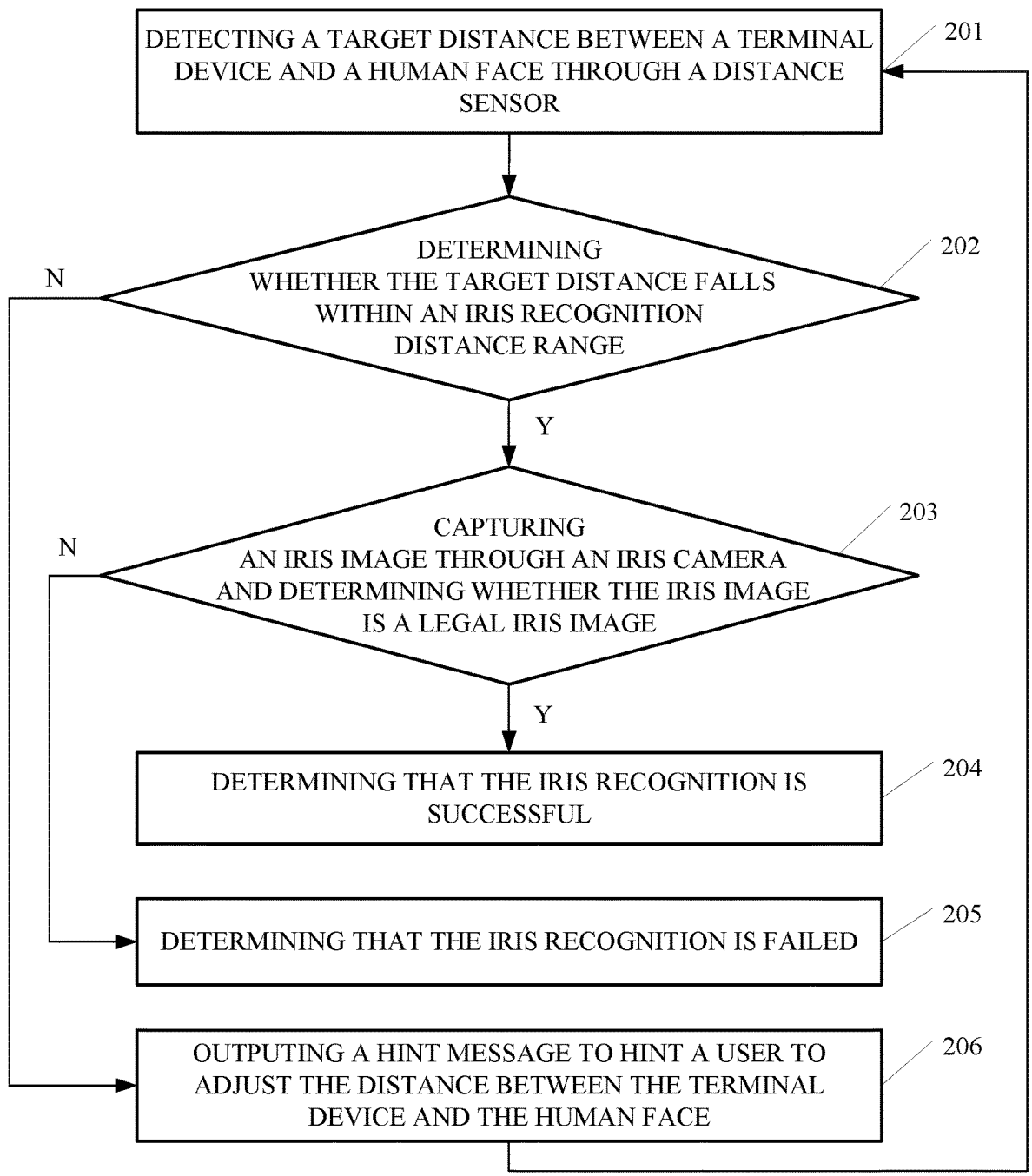
FIG. 5 is a schematic flowchart of a method for biometric recognition according to an implementation of the present disclosure.

FIG. 5 is a schematic flowchart of a method for biometric recognition according to an implementation of the present disclosure. The method is applied to a terminal device, which includes an application processor AP, a distance sensor, and an iris camera. The method may include the following operations at blocks illustrated in FIG. 5.

At block 201, the terminal device detects a target distance between the terminal device and a human face through the distance sensor.

In at least one alternative implementation, the operation at block 201 may include the follow. When the terminal device performs fingerprint recognition and when the number of fingerprint matching failure times detected reaches a predetermined number of times, the terminal device detects the target distance between the terminal device and a human face through the distance sensor.

At block 202, the terminal device determines whether the target distance falls within an iris recognition distance range. If the target distance falls within the iris recognition distance range, the operation at block 203 is performed. If the target distance does not fall within the iris recognition distance range, the operation at block 206 is performed.

At block 203, the terminal device captures an iris image through the iris camera and determines whether the iris image is a legal iris image. If the iris image is a legal iris image, the operation at block 204 is performed. If the iris image is not a legal iris image, the operation at block 205 is performed.

At block 204, the terminal device determines that the iris recognition is successful.

At block 205, the terminal device determines that the iris recognition is failed.

At block 206, the terminal device outputs a hint message to hint a user to adjust the distance between the terminal device and the human face.

In at least one alternative implementation, after the operation at block 206 is performed, the operation at block 201 may also be performed again.

In at least one alternative implementation, after the operation at block 202 is performed, the following operations (11)-(12) may also be performed.

(11) Based on a determination that the target distance falls within the iris recognition distance range, the terminal device detects an included angle between the terminal device and the human face.

(12) When the included angle between the terminal device and the human face falls within an iris recognition included angle range, the operation at block 203 is performed.

Implementations of the operations at blocks illustrated in FIG. 5 can refer to device-implementations illustrated in FIG. 1 to FIG. 4, which will not be described herein again.

According to the method illustrated in FIG. 5, the distance sensor detects the target distance between the terminal device and a human face. When the target distance falls within the iris recognition distance range, the terminal device enables the iris recognition function. The iris recognition function may be performed when the iris recognition condition is satisfied, which can quickly perform the biometric recognition, and can increase the speed of the biometric recognition.

Figure 6:
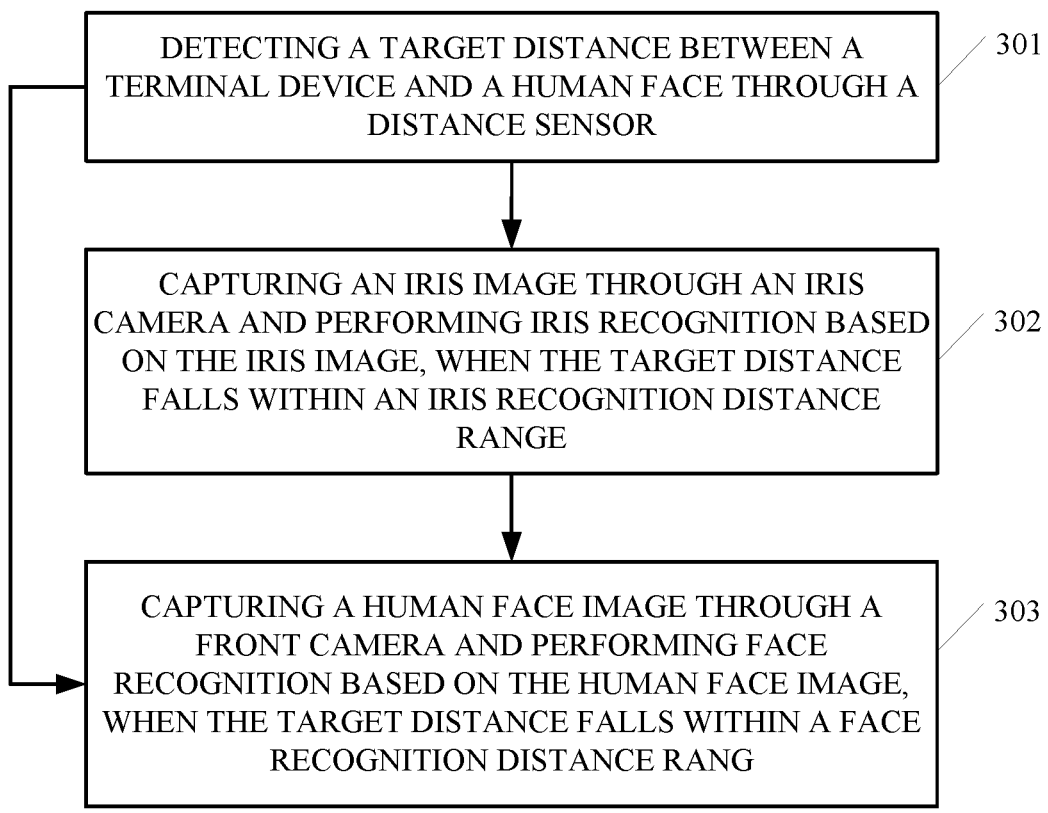
FIG. 6 is a schematic flowchart of another method for biometric recognition according to an implementation of the present disclosure.

FIG. 6 is a schematic flowchart of another method for biometric recognition according to an implementation of the present disclosure. The method is applied to a terminal device, which includes an application processor AP, a distance sensor, a front camera, and an iris camera. The method may include the following operations at blocks illustrated in FIG. 6.

At block 301, the terminal device detects a target distance between the terminal device and a human face through the distance sensor.

In at least one alternative implementation, the operation at block 301 may include the follow. When the terminal device performs fingerprint recognition and when the number of fingerprint matching failure times detected reaches a predetermined number of times, the terminal device detects the target distance between the terminal device and a human face through the distance sensor.

At block 302, when the target distance falls within an iris recognition distance range, the terminal device captures an iris image through the iris camera and performs iris recognition based on the iris image.

In at least one alternative implementation, before the terminal device captures the iris image through the iris camera and perform the iris recognition based on the iris image, the following operations may also be performed.

When the target distance falls within the iris recognition distance range, the terminal device detects an included angle between the terminal device and the human face.

When the included angle between the terminal device and the human face falls within an iris recognition included angle range, the terminal device captures the iris image through the iris camera and performs the iris recognition based on the iris image.

At block 303, when the target distance falls within a face recognition distance rang, the terminal device captures a human face image through the front camera and performs face recognition based on the human face image.

In at least one alternative implementation, before the terminal device captures the human face image through the front camera and perform the face recognition based on the human face image, the following operations may also be performed.

When the target distance falls within the human face recognition distance range, the terminal device detects an included angle between the terminal device and the human face.

When the included angle between the terminal device and the human face falls within a face recognition included angle range, the terminal device captures the human face image through the front camera and performs the face recognition based on the human face image.

Implementations of the operations at blocks illustrated in FIG. 6 can refer to device-implementations illustrated in FIG. 1 to FIG. 4, which will not be described herein again.

According to the method illustrated in FIG. 6, when the number of fingerprint matching failure times reaches a predetermined number of times, the terminal device detects the target distance between the terminal device and a human face through the distance sensor. When the target distance falls within the iris recognition distance range, the terminal device enables the iris recognition function, and when the target distance falls within the human face recognition distance range, the terminal device enables the face recognition function. The terminal device can perform the iris recognition when the iris recognition condition is satisfied, and perform the face recognition when the face recognition condition is satisfied, which can quickly select a suitable method for biometric recognition to recognize a living body, thereby increasing the speed of the biometric recognition, and can realize rapid biometric recognition without user's perception, which can improve the user experience.

Figure 7:
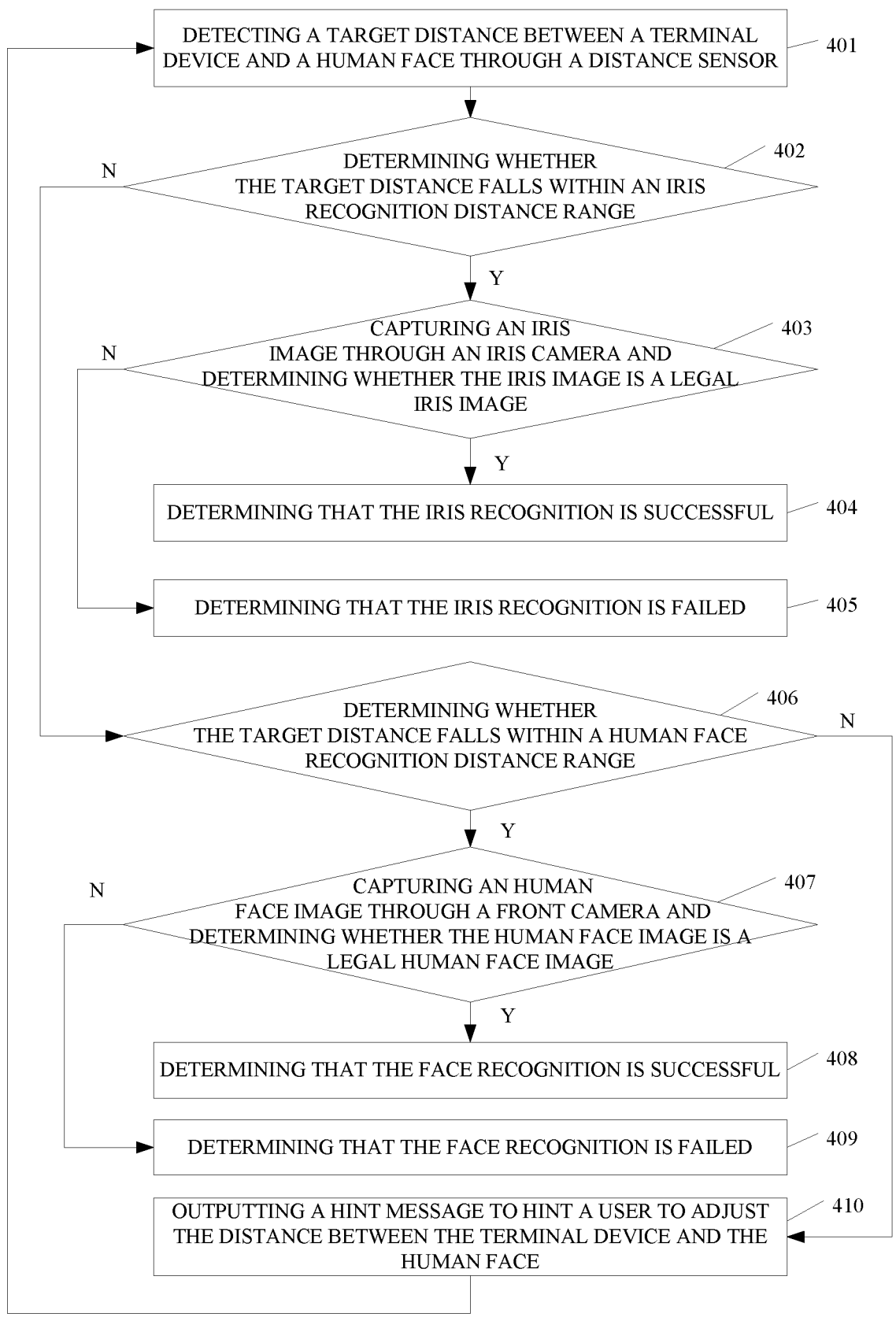
FIG. 7 is a schematic flowchart of another method for biometric recognition according to an implementation of the present disclosure.

FIG. 7 is a schematic flowchart of another method for biometric recognition according to an implementation of the present disclosure. The method is applied to a terminal device, which includes an application processor AP, a distance sensor, a front camera, and an iris camera. The method may include the following operations at blocks illustrated in FIG. 7.

At block 401, the terminal device detects a target distance between the terminal device and a human face through the distance sensor.

In at least one alternative implementation, the operation at block 401 may include the follow. When the terminal device performs fingerprint recognition and when the number of fingerprint matching failure times detected reaches a predetermined number of times, the terminal device detects the target distance between the terminal device and a human face through the distance sensor.

At block 402, the terminal device determines whether the target distance falls within an iris recognition distance range. If the target distance falls within the iris recognition distance range, the operation at block 403 is performed. If the target distance does not fall within the iris recognition distance range, the operation at block 406 is performed.

In at least one alternative implementation, after the operation at block 402 is performed, the following operations (21)-(22) may also be performed.

(21) Based on a determination that the target distance falls within the iris recognition distance range, the terminal device detects an included angle between the terminal device and the human face.

(22) When the included angle between the terminal device and the human face falls within an iris recognition included angle range, the operation at block 403 is performed.

At block 403, the terminal device captures an iris image through the iris camera and determines whether the iris image is a legal iris image. If the iris image is a legal iris image, the operation at block 404 is performed. If the iris image is not a legal iris image, the operation at block 405 is performed.

At block 404, the terminal device determines that the iris recognition is successful.

At block 405, the terminal device determines that the iris recognition is failed.

At block 406, the terminal device determines whether the target distance falls within a human face recognition distance range. If the target distance falls within the human face recognition distance range, the operation at block 407 is performed. If the target distance does not fall within the human face recognition distance range, the operation at block 410 is performed.

In at least one alternative implementation, after the operation at block 406 is performed, the following operations (41)-(42) may also be performed.

(41) Based on a determination that the target distance falls within the human face recognition distance range, the terminal device detects an included angle between the terminal device and the human face.

(42) When the included angle between the terminal device and the human face falls within a face recognition included angle range, the operation at block 407 is performed.

At block 407, the terminal device captures an human face image through the front camera and determines whether the human face image is a legal human face image. If the human face image is a legal human face image, the operation at block 408 is performed. If the human face image is not a legal human face image, the operation at block 409 is performed.

At block 408, the terminal device determines that the face recognition is successful.

At block 409, the terminal device determines that the face recognition is failed.

At block 410, the terminal device outputs a hint message to hint a user to adjust the distance between the terminal device and the human face.

In at least one alternative implementation, after the operation at block 410 is performed, the operation at block 401 may also be performed again.

Implementations of the operations at blocks illustrated in FIG. 7 can refer to device-implementations illustrated in FIG. 1 to FIG. 4, which will not be described herein again.

According to the method illustrated in FIG. 7, the iris recognition is prioritized to be performed when the fingerprint matching failure times reaches a predetermined number of times, and the face recognition is performed only when the condition required for performing the iris recognition is not satisfied. Priority is given to more secure biometric recognition manner, thereby improving the security of the biometric recognition.

Figure 8:
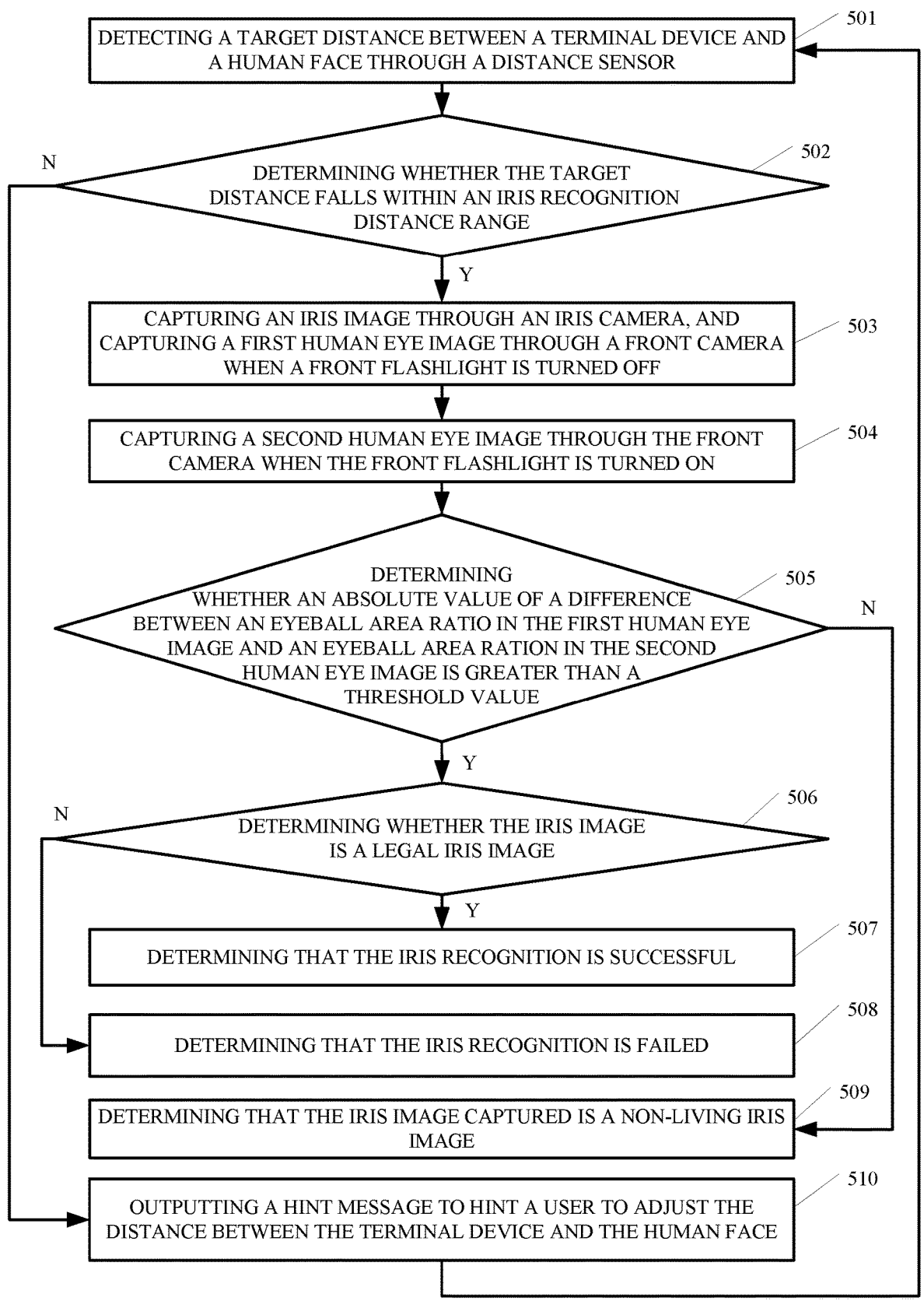
FIG. 8 is a schematic flowchart of another method for biometric recognition according to an implementation of the present disclosure.

FIG. 8 is a schematic flowchart of another method for biometric recognition according to an implementation of the present disclosure. The method is applied to a terminal device, which includes an application processor AP, a distance sensor, and an iris camera. The method may include the following operations at blocks illustrated in FIG. 8.

At block 501, the terminal device detects a target distance between the terminal device and a human face through the distance sensor.

In at least one alternative implementation, the operation at block 501 may include the follow. When the terminal device performs fingerprint recognition and when the number of fingerprint matching failure times detected reaches a predetermined number of times, the terminal device detects the target distance between the terminal device and a human face through the distance sensor.

At block 502, the terminal device determines whether the target distance falls within an iris recognition distance range. If the target distance falls within the iris recognition distance range, the operation at block 503 is performed. If the target distance does not fall within the iris recognition distance range, the operation at block 510 is performed.

In at least one alternative implementation, after the operation at block 502 is performed, the following operations (51)-(52) may also be performed.

(51) Based on a determination that the target distance falls within the iris recognition distance range, the terminal device detects an included angle between the terminal device and the human face.

(52) When the included angle between the terminal device and the human face falls within an iris recognition included angle range, the operation at block 503 is performed.

At block 503, the terminal device captures an iris image through the iris camera, and captures a first human eye image through the front camera when the front flashlight is turned off.

At block 504, the terminal device captures a second human eye image through the front camera when the front flashlight is turned on.

At block 505, the terminal device determines whether an absolute value of a difference between an eyeball area ratio in the first human eye image and an eyeball area ration in the second human eye image is greater than a threshold value. If the absolute value of the difference is greater than the threshold value, the operation at block 506 is performed. If the absolute value of the difference is not greater than the threshold value, the operation at block 509 is performed.

At block 506, the terminal device determines whether the iris image is a legal iris image. If the iris image is a legal iris image, the operation at block 507 is performed. If the iris image is not a legal iris image, the operation at block 508 is performed.

At block 507, the terminal device determines that the iris recognition is successful.

At block 508, the terminal device determines that the iris recognition is failed.

At block 509, the terminal device determines that the iris image captured is a non-living iris image.

At block 510, the terminal device outputs a hint message to hint a user to adjust the distance between the terminal device and the human face.

In at least one alternative implementation, after the operation at block 510 is performed, the operation at block 501 may also be performed again.

Implementations of the operations at blocks illustrated in FIG. 8 can refer to device-implementations illustrated in FIG. 1 to FIG. 4, which will not be described herein again.

According to the method illustrated in FIG. 8, the distance sensor detects the target distance between the terminal device and a human face. When the target distance falls within the iris recognition distance range, the terminal device enables the iris recognition function. The iris recognition function may be performed when the iris recognition condition is satisfied, which can quickly perform the biometric recognition, and can increase the speed of the biometric recognition. With aid of the implementation of the disclosure, it is possible to determine whether the human eye image captured is a living human eye image by determining whether the absolute value of the difference between the eyeball area rations in the human eye images captured by the front camera is greater than the threshold value, where the human eye images are captured when the front flashlight in two states of being turned off and on. Therefore, a simple the living body recognition scheme can be achieved.

Figure 9:
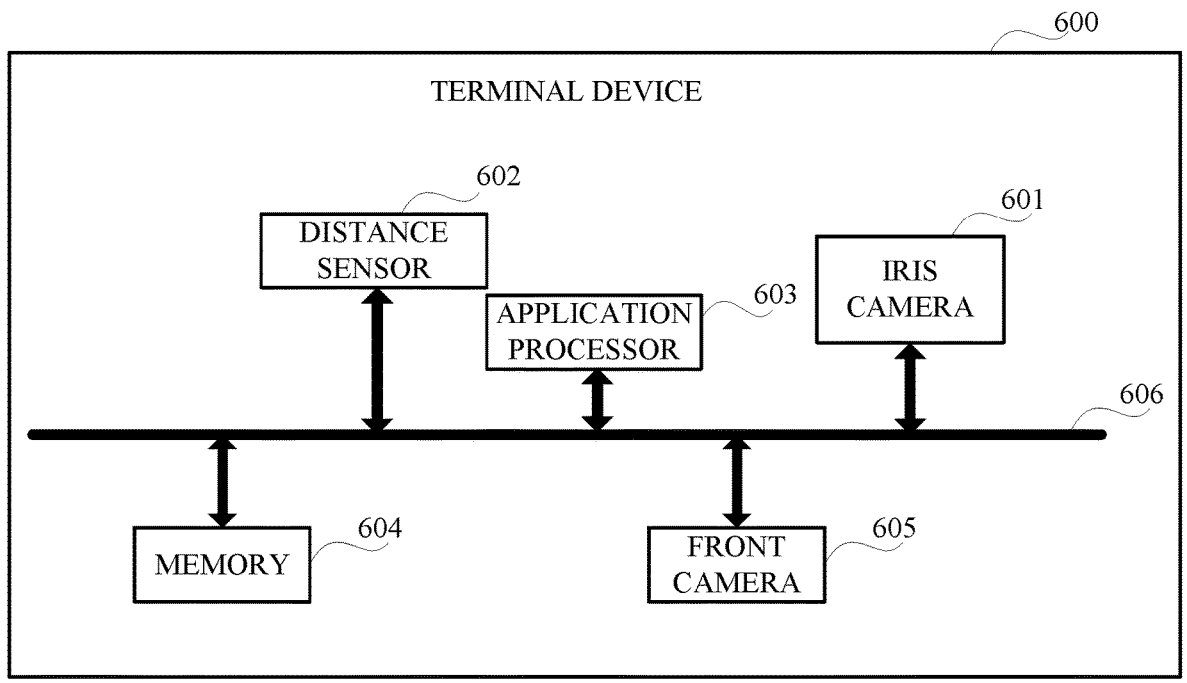
FIG. 9 is a schematic structural diagram of another terminal device according to an implementation of the present disclosure.

FIG. 9 is a schematic structural diagram of another terminal device according to an implementation of the present disclosure. The terminal device 600 includes an iris camera 601, a distance sensor 602, an application processor (AP) 603, a memory 604 and a front camera 605, which may be connected via a communication bus 606. The memory 604 is configured to store one or more programs, and the one or more programs are configured to be executed by the AP 603. The programs include instructions operable with a computer to execute part or all of the operations described in any one of the methods illustrated in above-described FIG. 5 to FIG. 8.

According to the terminal device illustrated in FIG. 9, the terminal device detects the target distance between the terminal device and a human face through the distance sensor. When the target distance falls within the iris recognition distance range, the terminal device enables the iris recognition function, and when the target distance falls within a human face recognition distance range, the terminal device enables the face recognition function. The terminal device can perform the iris recognition when the iris recognition condition is satisfied, and perform the face recognition when the face recognition condition is satisfied, which can quickly select a suitable method for biometric recognition to recognize a living body, thereby increasing the speed of the biometric recognition, and can realize rapid biometric recognition without user's perception, which can improve the user experience.

Figure 10:
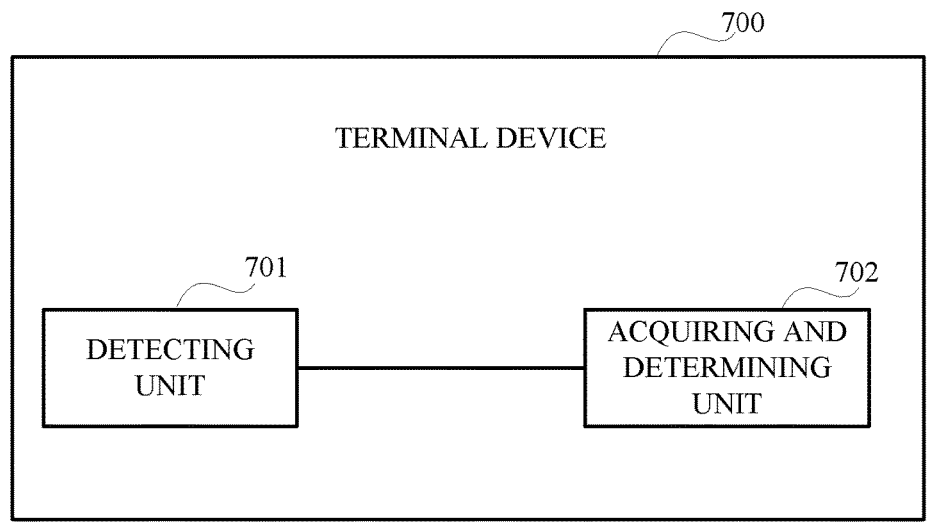
FIG. 10 is a schematic structural diagram of another terminal device according to an implementation of the present disclosure.

FIG. 10 is a schematic structural diagram of another terminal device according to an implementation of the present disclosure. The terminal device 700 includes a detecting unit 701 and an acquiring and determining unit 702.

The detecting unit 701 is configured to detect a target distance between the terminal device and a human face through the distance sensor.

The acquiring and determining unit 702 is configured to capture an iris image through an iris camera and perform iris recognition based on the iris image.

The acquiring and determining unit 702 is further configured to capture a human face image through a front camera and perform face recognition based on the human face image.

Implementations of the terminal device can refer to method-implementations illustrated in FIGS. 5-8. The disclosure will not be repeated herein It should be noted that, the terminal device 700 described in the implementation of the present disclosure is presented in the form of a functional unit. As used herein, the term "unit" should be interpreted as being as widest as possible. Objects used to implement the functions described in each "unit" may be, for example, an integrated circuit ASIC, a single circuit, a processor (shared, dedicated, or chipset) and memory for executing one or more software or firmware programs, a combinational logic circuit, and/or other suitable components to accomplish the above-described functions.

According to the terminal device illustrated in FIG. 10, the terminal device detects the target distance between the terminal device and a human face through the distance sensor. When the target distance falls within the iris recognition distance range, the terminal device enables the iris recognition function, and when the target distance falls within a human face recognition distance range, the terminal device enables the face recognition function. The terminal device can perform the iris recognition when the iris recognition condition is satisfied, and perform the face recognition when the face recognition condition is satisfied, which can quickly select a suitable method for biometric recognition to recognize a living body, thereby increasing the speed of the biometric recognition, and can realize rapid biometric recognition without user's perception, which can improve the user experience.

An implementation of the present disclosure further provides another terminal device.

Figure 11:
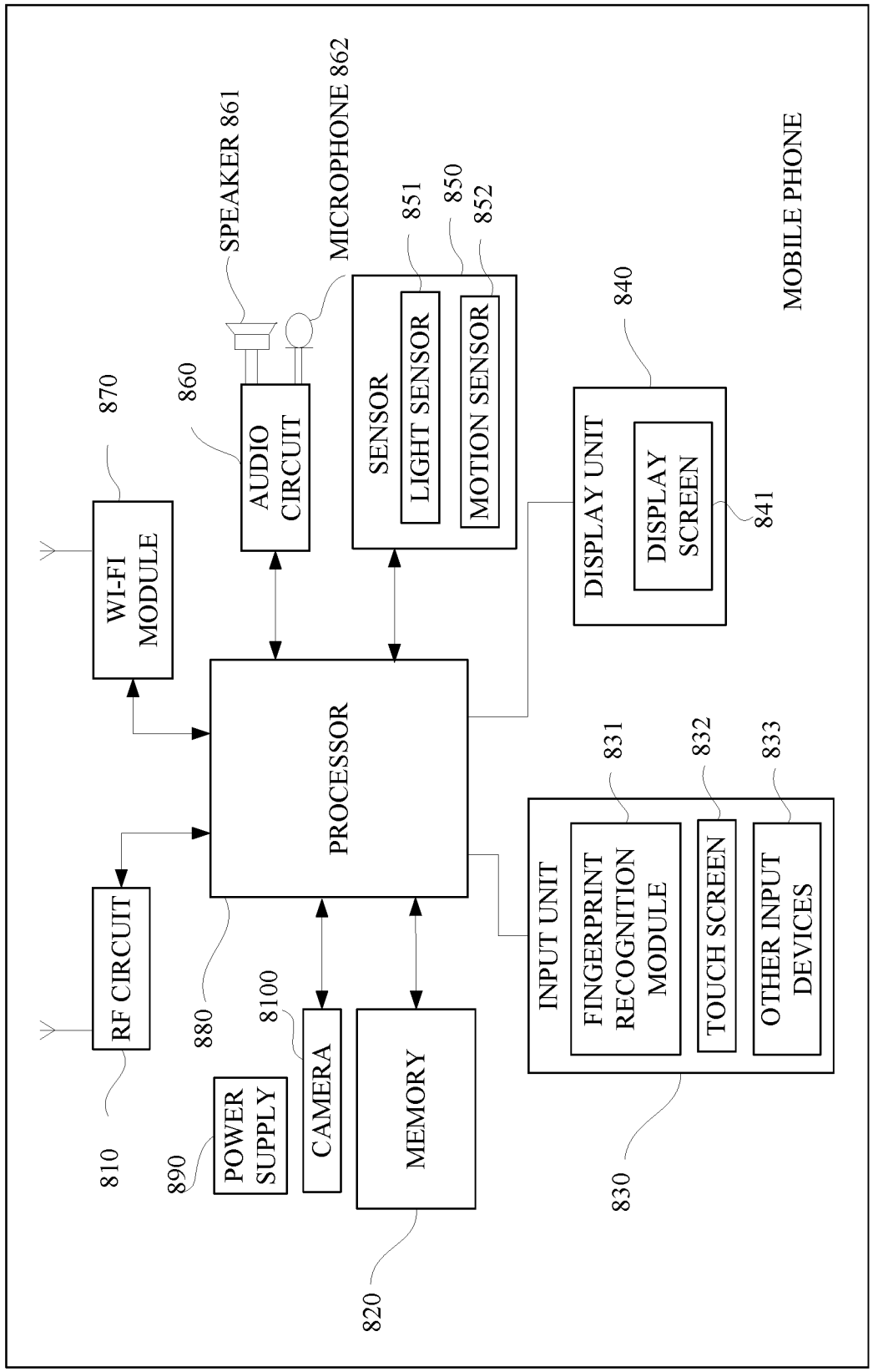
FIG. 11 is a schematic structural diagram of another terminal device according to an implementation of the present disclosure.

For the convenience of description, as illustrated in FIG. 11, only parts related to the implementations of the present disclosure are illustrated for ease of description. For technical details not described, reference may be made to the method implementations of the present disclosure. The terminal device may be any terminal device, such as a mobile phone, a tablet computer, a personal digital assistant (PDA), a point of sale terminal (POS), an on-board computer and so on. The following describes the mobile phone as an example of the terminal device.

FIG. 11 is a block diagram of a part of a structure of a mobile phone related to a terminal device according to an implementation of the present disclosure. As illustrated in FIG. 11, the mobile phone includes a radio frequency (RF) circuit 810, a memory 820, an input unit 830, a display unit 840, a sensor 850, an audio circuit 860, a wireless fidelity (Wi-Fi) module 870, a processor 880, a power supply 890 and other components. Those skilled in the art can understand that the structure of the mobile phone illustrated in FIG. 11 does not constitute any limitation on a mobile phone. The mobile phone configured to implement technical solutions of the present disclosure may include more or fewer components than illustrated or may combine certain components or different components.

In the following, various components of the mobile phone will be described in detail with reference to FIG. 11.

The RF circuit 810 is configured to transmit or receive information. Generally, the RF circuit 810 includes but is not limited to an antenna, at least one amplifier, a transceiver, a coupler, a low noise amplifier (LNA), a duplexer, and so on. In addition, the RF circuit 810 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 820 is configured to store software programs and modules, and the processor 880 is configured to execute various function applications and data processing of the mobile phone by running the software programs and the modules stored in the memory 820. The memory 820 mainly includes a program storage area and a data storage area. The program storage area may store an operating system, application programs required for at least one function and so on. The data storage area may store data created according to use of the mobile phone, and so on. In addition, the memory 820 may include a high-speed RAM, and may further include a non-volatile memory such as at least one disk storage device, a flash device, or other non-volatile solid storage devices.

The input unit 830 may be configured to receive input digital or character information, and generate key signal input associated with user setting and function control of the mobile phone. As one implementation, the input unit 830 may include a fingerprint recognition module 831, a touch screen 832, and other input devices 833. The fingerprint recognition module 831 can collect fingerprint data of the user. In addition to the fingerprint recognition module 831, the input unit 830 may further include other input devices 833. As one implementation, the other input devices 833 may include, but not limit to, one or more of a touch screen, a physical key, a function key (such as a volume control key, a switch key, etc.), a trackball, a mouse, a joystick and so on.

The display unit 840 is configured to display information input by the user or information provided for the user or various menus of the mobile phone. The display unit 840 may include a display screen 841, and alternatively, the display screen 841 may be in the form of a liquid crystal display (LCD), an organic light-emitting diode (OLED) and so on. Although the fingerprint recognition module 831 and the display screen 841 are illustrated as two separate components in FIG. 11 to realize the input and output functions of the mobile phone, in some implementations, the fingerprint recognition module 831 may be integrated with the display screen 841 to implement the input and output functions of the mobile phone.

The mobile phone may also include at least one sensor 850, such as a light sensor 851, a motion sensor 852, and other sensors. As one implementation, the light sensor 851 may include an ambient light sensor and a proximity sensor, among which the ambient light sensor may adjust the brightness of the display screen 841 according to ambient lights, and the proximity sensor may turn off the display screen 841 and/or backlight when the mobile phone reaches nearby the ear. As a kind of motion sensor 852, the accelerometer sensor can detect the magnitude of acceleration in all directions (typically three axes) and when the mobile phone is stationary, the accelerometer sensor can detect the magnitude and direction of gravity. The accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and infrared sensor and other sensors, and it will not be repeated herein.

The mobile phone may also include a speaker 861 and a microphone 862 respectively coupled to the audio circuit 860. The audio circuit 860, the speaker 861, the microphone 862 may provide an audio interface between the user and the mobile phone. The audio circuit 860 may convert the received audio data into electrical signals and transfer the electrical signals to the speaker 861; thereafter the speaker 861 converts the electrical signals into sound signals to output. On the other hand, the microphone 862 converts the received sound signals into electrical signals, which will be received and converted into audio data by the audio circuit 860 to output. The audio data is then processed and transmitted by the processor 880 via a RF circuit 810 to another mobile phone for example, or, the audio data is output to the memory 820 for further processing.

Wi-Fi belongs to a short-range wireless transmission technology. With aid of the Wi-Fi module 870, the mobile phone may assist the user in E-mail receiving and sending, web-page browsing, accessing to streaming media and so on. Wi-Fi provides users with wireless broadband Internet access. Although the Wi-Fi module 870 is illustrated in FIG. 11, it will be understood that the Wi-Fi module 870 is not essential to the mobile phone and can be omitted according to actual needs without departing from the essential nature of the present disclosure.

The processor 880 is the control center of the mobile phone, it connects various parts of the whole mobile phone through various interfaces and lines, runs or executes software programs and/or modules stored in the memory 820, and invokes data stored in the memory 820 to perform various functions of the mobile phone and process data, thereby monitoring the mobile phone as a whole. In at least one implementation, the processor 880 may include one or more processing units. For example, the processor 880 may integrate an application processor and a modem processor, where the application processor handles the operating system, the user interface, the application, and so on, and the modem processor mainly processes wireless communication. It will be understood that the above-mentioned modem processor may also not be integrated into the processor 880.

The mobile phone also includes a power supply 890 (such as a battery) that supplies power to various components. For instance, the power supply 890 may be logically coupled to the processor 880 via a power management system to enable management of charging, discharging, and power consumption through the power management system.

The mobile phone further includes a camera 8100. The camera 8100 may include a front camera, an iris camera, and a rear camera.

Although not illustrated, the mobile phone may also include a Bluetooth module, flashlight, and so on. The flashlight can include a front flashlight and a rear flashlight, where the front flashlight can fill the front camera and the rear flashlight can fill the rear camera. The front flashlight may include a front visible flashlight and a front infrared flashlight, where the front visible flashlight is used to fill the front camera and the front infrared flashlight is used to fill the iris camera.

Implementations of the present disclosure also provide a non-transitory computer readable storage medium, on which a computer program is stored. The computer program is executed by a processor to carry out following actions. A target distance between a terminal device and a human face through a distance sensor is detected. An iris image is captured through an iris camera and iris recognition is performed based on the iris image, when the target distance falls within an iris recognition distance range. A human face image is captured through a front camera and a face recognition is performed based on the human face image, when the target distance falls within a human face recognition distance range.

The computer program is further executed by the processor to carry out following actions. The action of capturing an iris image through an iris camera and performing iris recognition based on the iris image is performed, when the target distance falls within the iris recognition distance range as well as the human face recognition distance range.

Implementations of the present disclosure also provide a computer program product. The computer program product includes a non-transitory computer readable storage medium storing computer programs. The computer programs are operable with a computer to perform part or all of the operations of any of the method for biometric recognition described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions of other implementations.

In the implementations of the disclosure, the apparatus disclosed in implementations provided herein may be implemented in other manners. For example, the device/apparatus implementations described above are merely illustrative. For instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit may be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or part of the operations of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A terminal device, comprising:
   a distance sensor configured to detect a target distance between the terminal device and a human face;
   an iris camera coupled to the distance sensor and configured to capture an iris image when the target distance falls within an iris recognition distance range;
   a front camera coupled to the distance sensor and configured to capture a human face image when the target distance falls within a human face recognition distance range; and
   an application processor (AP) coupled to the distance sensor, the iris camera, and the front camera, the AP configured to:
      detect, through the distance sensor, the target distance between the terminal device and the human face;
      detect, through the front camera, an included angle between the terminal device and the human face, when the target distance falls within at least one of the iris recognition distance range and the human face recognition distance range;
      capture an iris image through the iris camera and implement a secure authentication by performing an iris recognition based on the iris image, when the target distance falls within the iris recognition distance range and the included angle falls within an iris recognition included angle range; and
      capture a human face image through the front camera and implement the secure authentication by performing a face recognition based on the human face image when the target distance falls within the human face recognition distance range and the included angle falls within a face recognition included angle range.

2. The terminal device of claim 1, wherein the AP is further configured to output a hint message to hint a user to adjust the distance between the terminal device and the human face, when the target distance neither falls within the iris recognition distance range nor falls within the human face recognition distance range.

3. The terminal device of claim 1, wherein the iris recognition distance range and the human face recognition distance range have an overlapping range; and
   the AP is further configured to capture the iris image through the iris camera and implement the secure authentication by performing the iris recognition based on the iris image captured by the iris camera, when the target distance falls within the iris recognition distance range and the human face recognition distance range.

4. The terminal device of claim 1, wherein the AP is further configured to:
   extract iris feature points of the iris image and encode the iris feature points to obtain iris feature codes;
   compare the iris feature codes with pre-stored iris feature codes; and
   determine that the iris image is a legal iris image based on a determination that the iris feature codes matches the pre-stored iris feature codes, wherein
   the AP configured to implement the secure authentication by performing the iris recognition based on the iris image is further configured to:
   determine that the iris recognition is successful based on a determination that the iris image is a legal iris image.

5. The terminal device of claim 4, the terminal device further comprising a front flashlight coupled to the AP, wherein the AP is further configured to capture a first human eye image through the front camera when the front flashlight is turned off during the iris camera capturing the iris image;

the AP is further configured to capture a second human eye image through the front camera when the front flashlight is turned on;

the AP is configured to perform the iris recognition based on the iris image, based on a determination that an absolute value of a difference between an eyeball area ratio in the first human eye image and an eyeball area ration in the second human eye image is greater than a threshold value; and the AP is further configured to determine that the iris image captured is a non-living iris image based on a determination that the absolute value is smaller than or equal to the threshold value.

6. The terminal device of claim 1, wherein the AP is further configured to:

compare the human face image with a pre-stored human face image template; and determine that the human face image is a legal human face image based on a determination that the human face image matches the pre-stored human face image template, wherein the AP configured to implement the secure authentication by performing the face recognition based on the human face image is further configured to:

determine that the face recognition is successful based on a determination that the human face image is a legal human face image.

7. A method for biometric recognition, comprising:

detecting a target distance between a terminal device and a human face through a distance sensor;

detecting, through a front camera, an included angle between the terminal device and the human face, when the target distance falls within at least one of an iris recognition distance range and a human face recognition distance range;

capturing an iris image through an iris camera and implementing a secure authentication by performing an iris recognition based on the iris image, when the target distance falls within the iris recognition distance range and the included angle falls within an iris recognition included angle range; and capturing a human face image through a front camera and implementing a secure authentication by performing a face recognition based on the human face image, when the target distance falls within the human face recognition distance range and the included angle falls within a face recognition included angle range.

8. The method of claim 7, further comprising:

outputting a hint message to hint a user to adjust the distance between the terminal device and the human face, when the target distance neither falls within the iris recognition distance range nor falls within the human face recognition distance range.

9. The method of claim 7, wherein the iris recognition distance range and the human face recognition distance range have an overlapping range, and the method further comprises:

capturing the iris image through the iris camera and implementing the secure authentication by performing the iris recognition based on the iris image, when the target distance falls within the iris recognition distance range and the human face recognition distance range.

10. The method of claim 7, further comprising:

extracting iris feature points of the iris image and encoding the iris feature points to obtain iris feature codes;

comparing the iris feature codes with pre-stored iris feature codes; and determining that the iris image is a legal iris image based on a determination that the iris feature codes matches the pre-stored iris feature codes, wherein implementing the secure authentication by performing the iris recognition based on the iris image comprises:

determining that the iris recognition is successful based on a determination that the iris image is a legal iris image.

11. The method of claim 10, further comprising:

capturing a first human eye image through the front camera when a front flashlight is turned off during the iris camera capturing the iris image;

capturing a second human eye image through the front camera when the front flashlight is turned on;

performing the iris recognition based on the iris image, based on a determination that an absolute value of a difference between an eyeball area ratio in the first human eye image and an eyeball area ration in the second human eye image is greater than a threshold value; and determining that the iris image captured is a non-living iris image, based on a determination that the absolute value is smaller than or equal to the threshold value.

12. The method of claim 7, further comprising:

comparing the human face image with a pre-stored human face image template; and determining that the human face image is a legal human face image based on a determination that the human face image matches the pre-stored human face image template, wherein implementing the secure authentication by performing the face recognition based on the human face image comprises:

determining that the face recognition is successful based on a determination that the human face image is a legal human face image.

13. A non-transitory computer-readable storage medium storing a computer program which, when executed by a processor, causes the processor to:

detect a target distance between a terminal device and a human face through a distance sensor;

detect, through a front camera, an included angle between the terminal device and the human face, when the target distance falls within at least one of an iris recognition distance range and a human face recognition distance range;

capture an iris image through an iris camera and implement a secure authentication by performing an iris recognition based on the iris image, when the target distance falls within the iris recognition distance range and the included angle falls within an iris recognition included angle range; and capture a human face image through the front camera and implement a secure authentication by performing a face recognition based on the human face image, when the target distance falls within the human face recognition distance range and the included angle falls within a face recognition included angle range.

14. The non-transitory computer-readable storage medium of claim 13, wherein the iris recognition distance range and the human face recognition distance range have an overlapping range, and the computer program is further executed by the processor to:

capture the iris image through the iris camera and implement a secure authentication by performing the iris recognition based on the iris image, when the target distance falls within the iris recognition distance range and the human face recognition distance range.

15. The terminal device of claim 1, wherein the AP is further configured to:
   detect fingerprint matching failure times in a fingerprint recognition process; and
   perform the action of detecting, through the distance sensor, the target distance between the terminal device and the human face, when the fingerprint matching failure times detected reaches a predetermined number of times.

16. The method of claim 7, further comprising:
   detect fingerprint matching failure times in a fingerprint recognition process; and
   perform the action of detecting, through the distance sensor, the target distance between the terminal device and the human face, when the fingerprint matching failure times detected reaches a predetermined number of times.

17. The non-transitory computer-readable storage medium of claim 13, wherein the computer program is further executed by the processor to:
   detect fingerprint matching failure times in a fingerprint recognition process; and
   perform the action of detecting, through the distance sensor, the target distance between the terminal device and the human face, when the fingerprint matching failure times detected reaches a predetermined number of times.

* * * * *